Inventors
Peter Kirsinas
Robert F. Plattner
By William P. Porcelli
Atty.

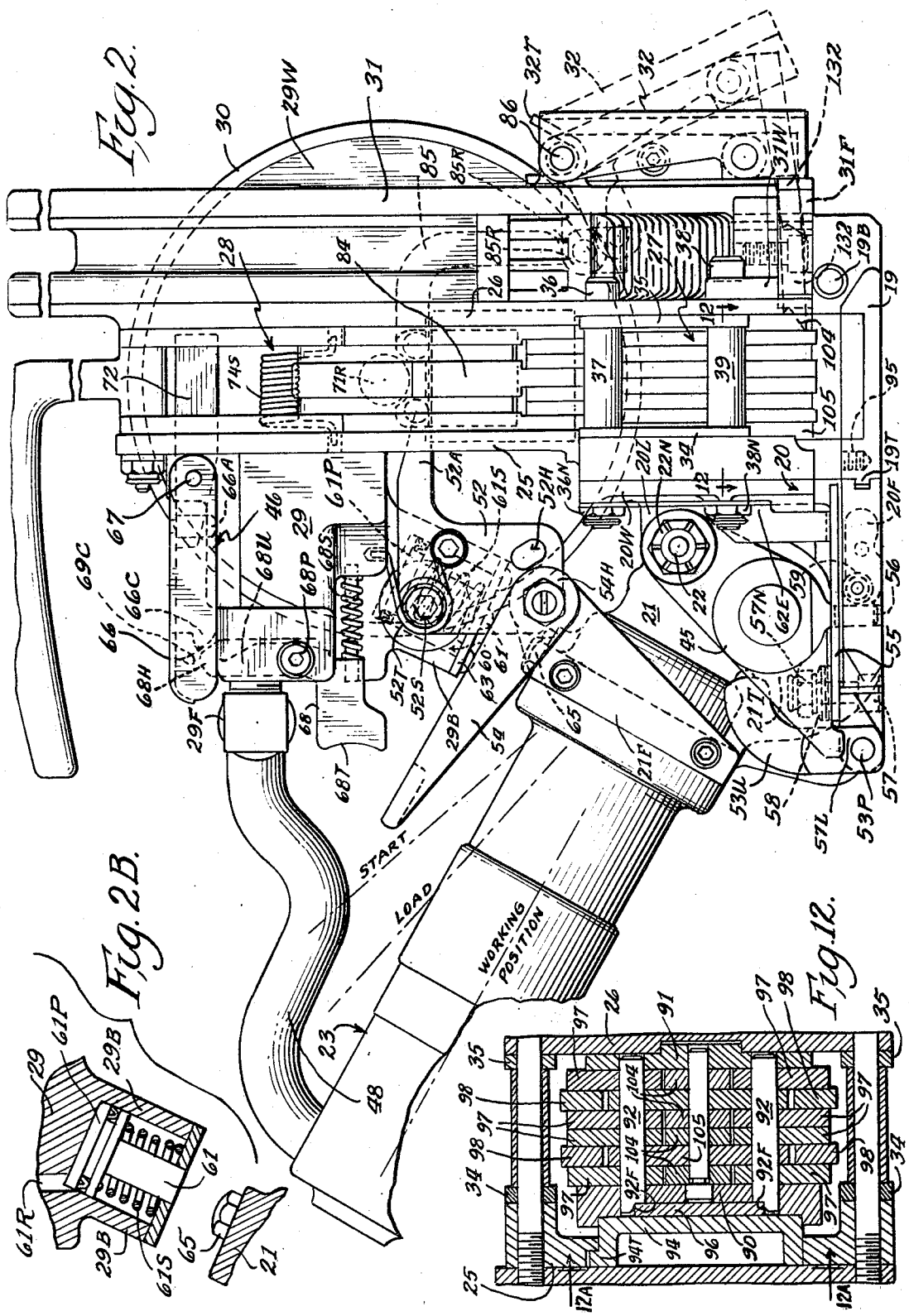

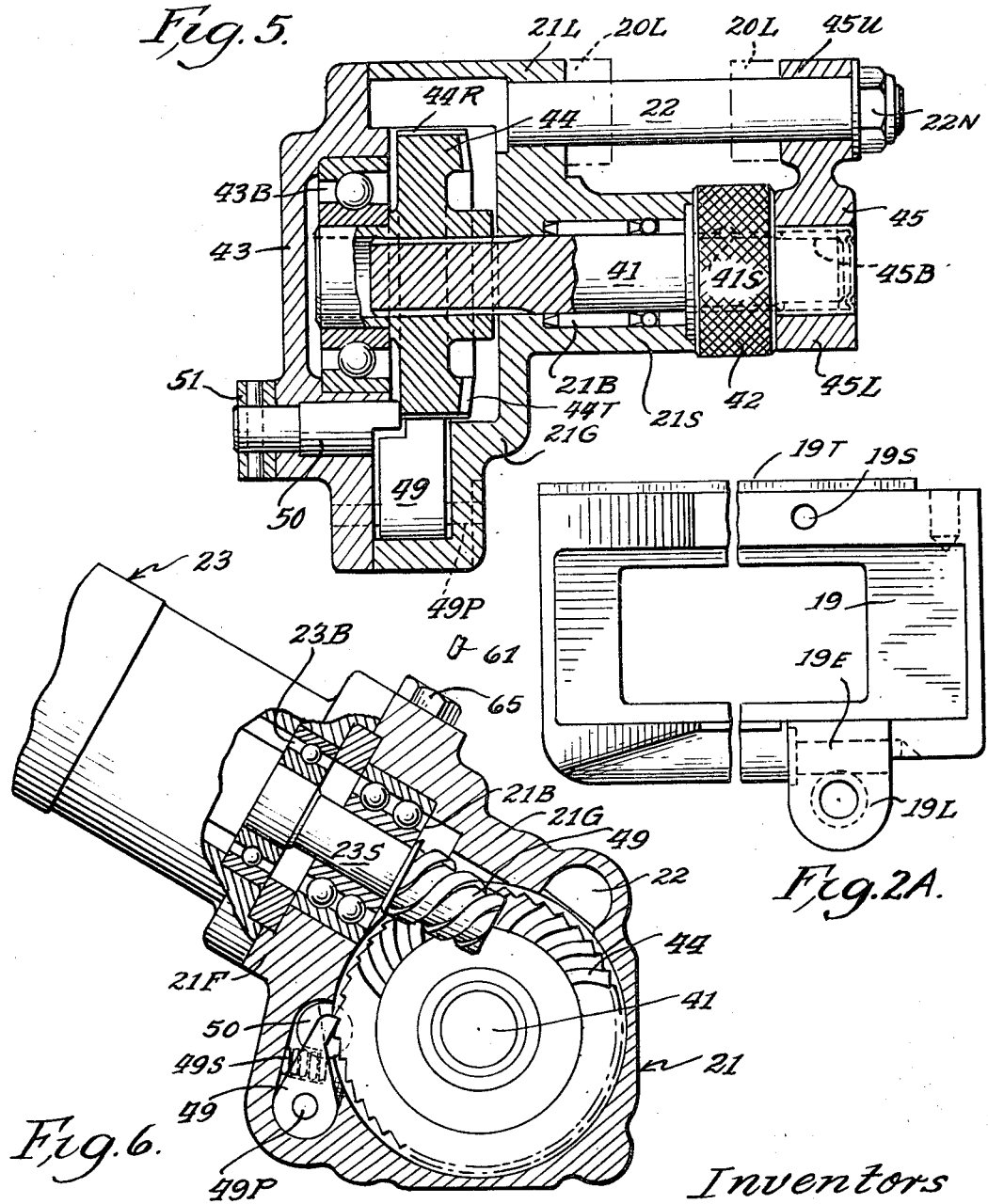

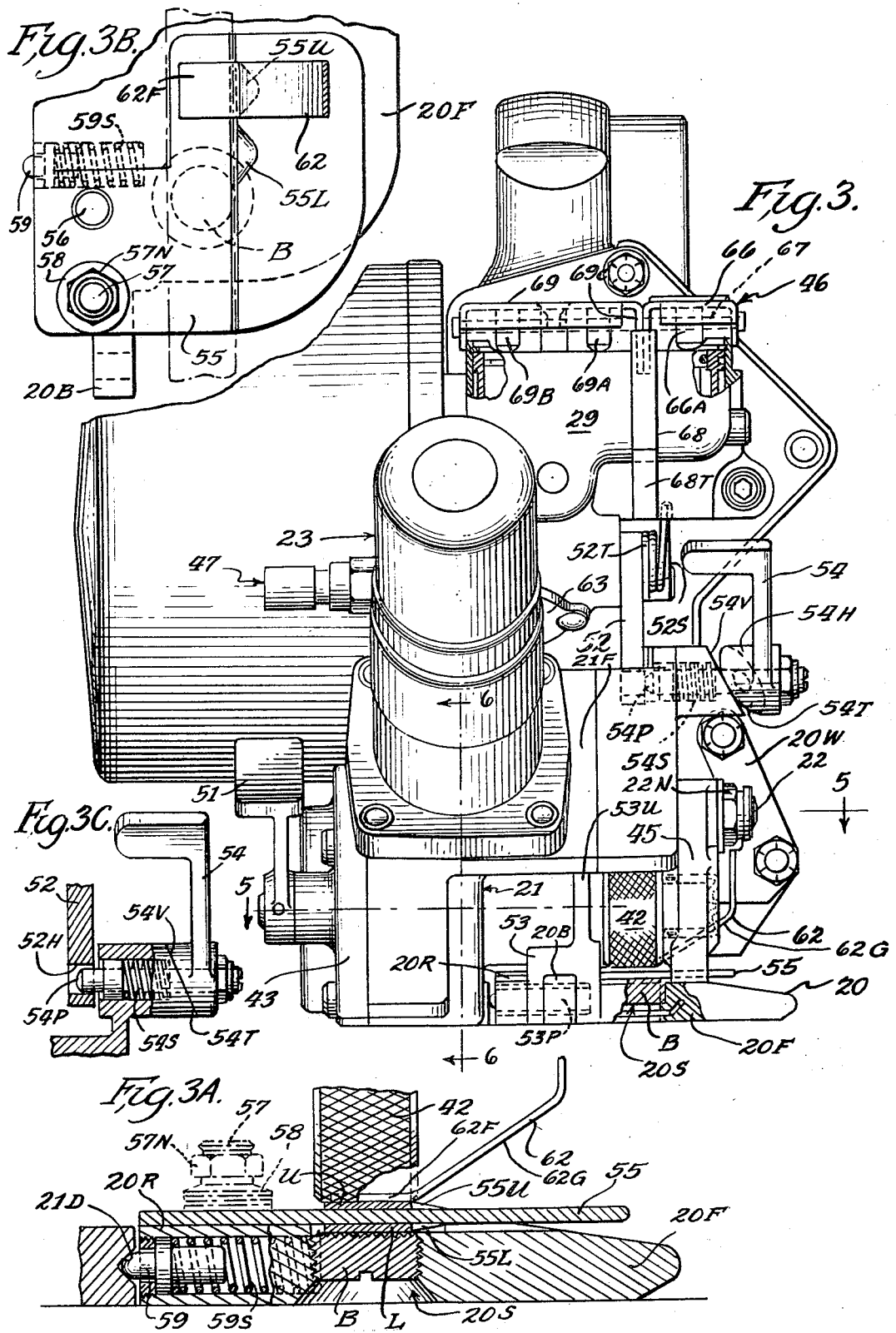

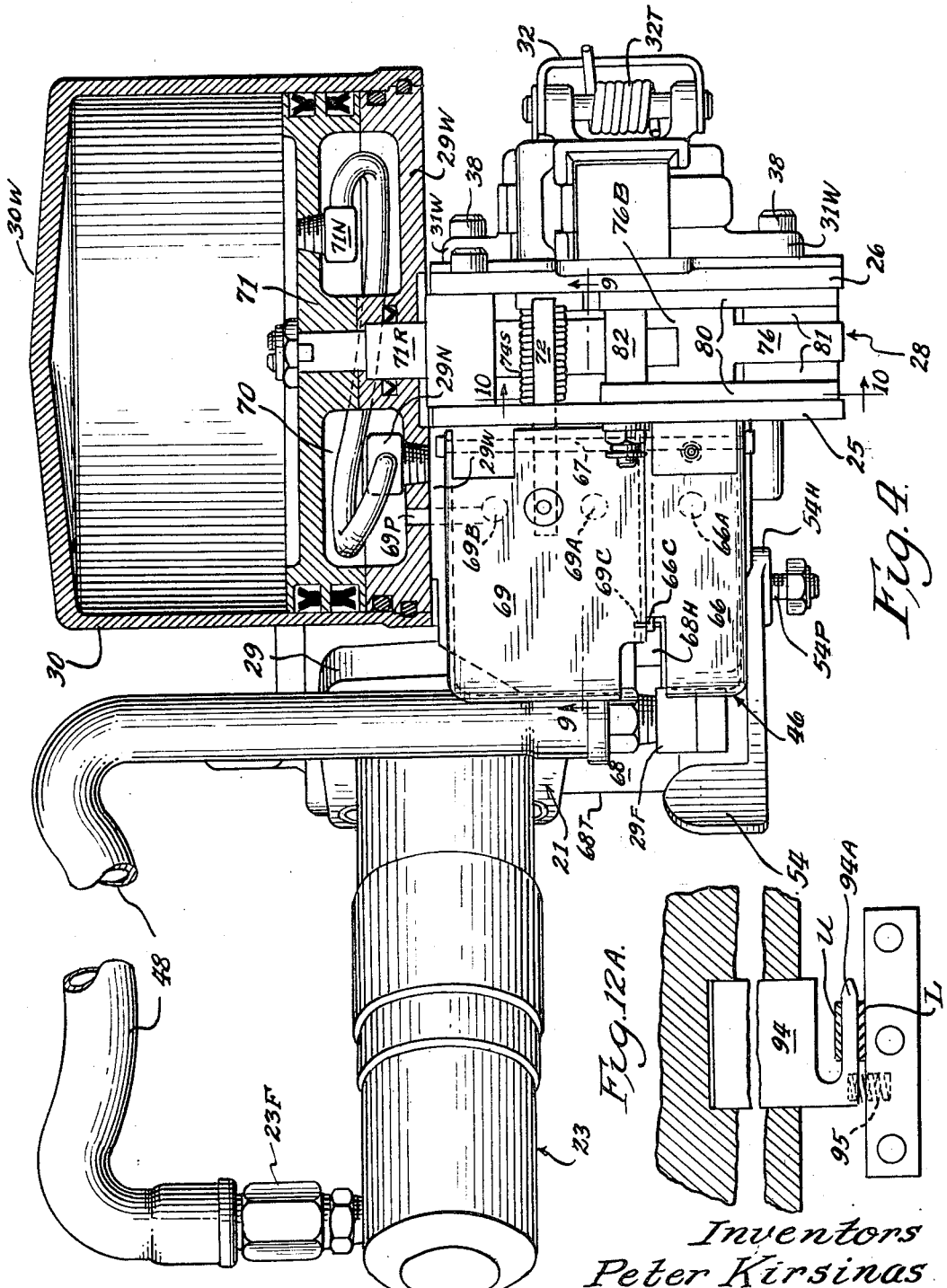

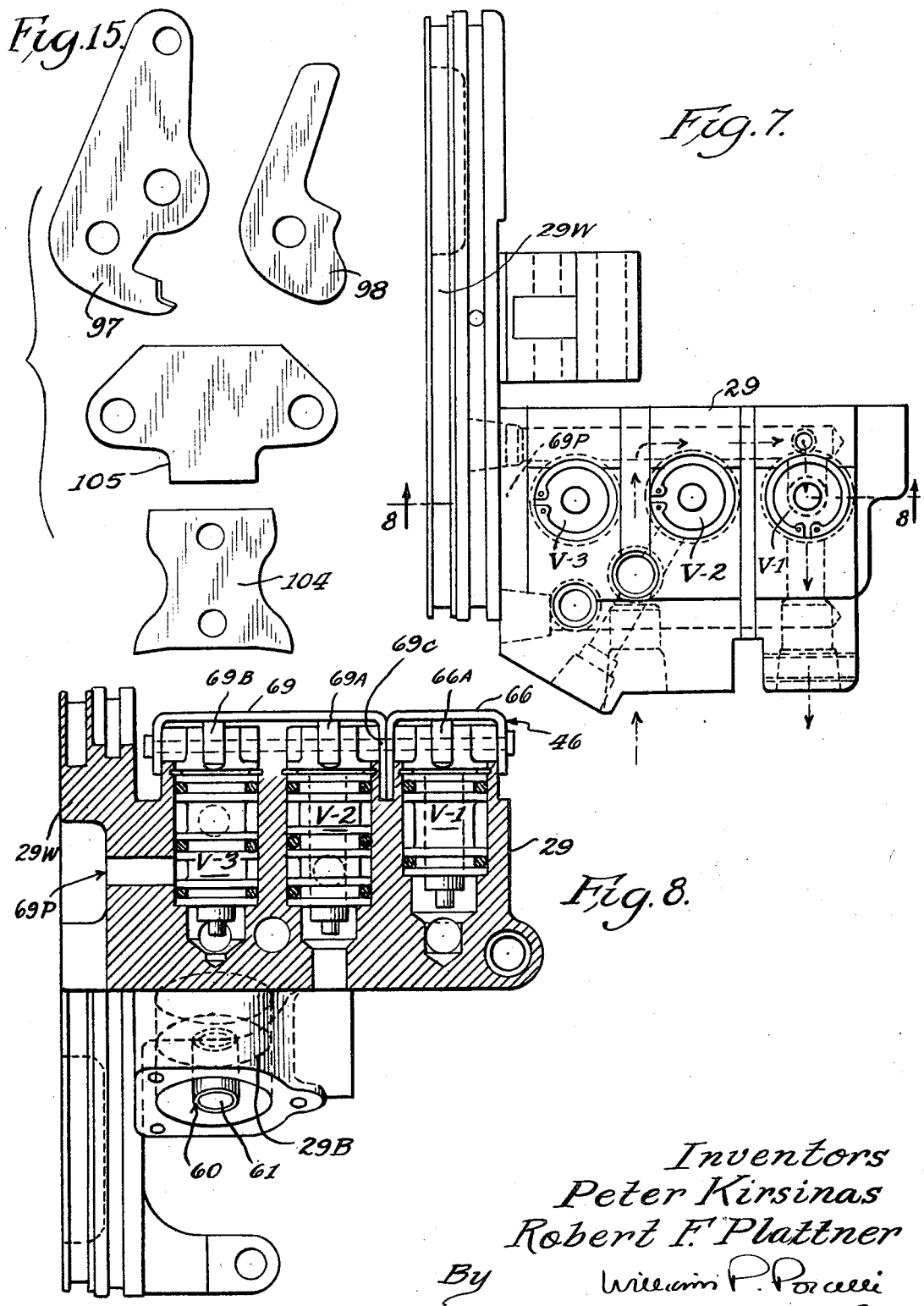

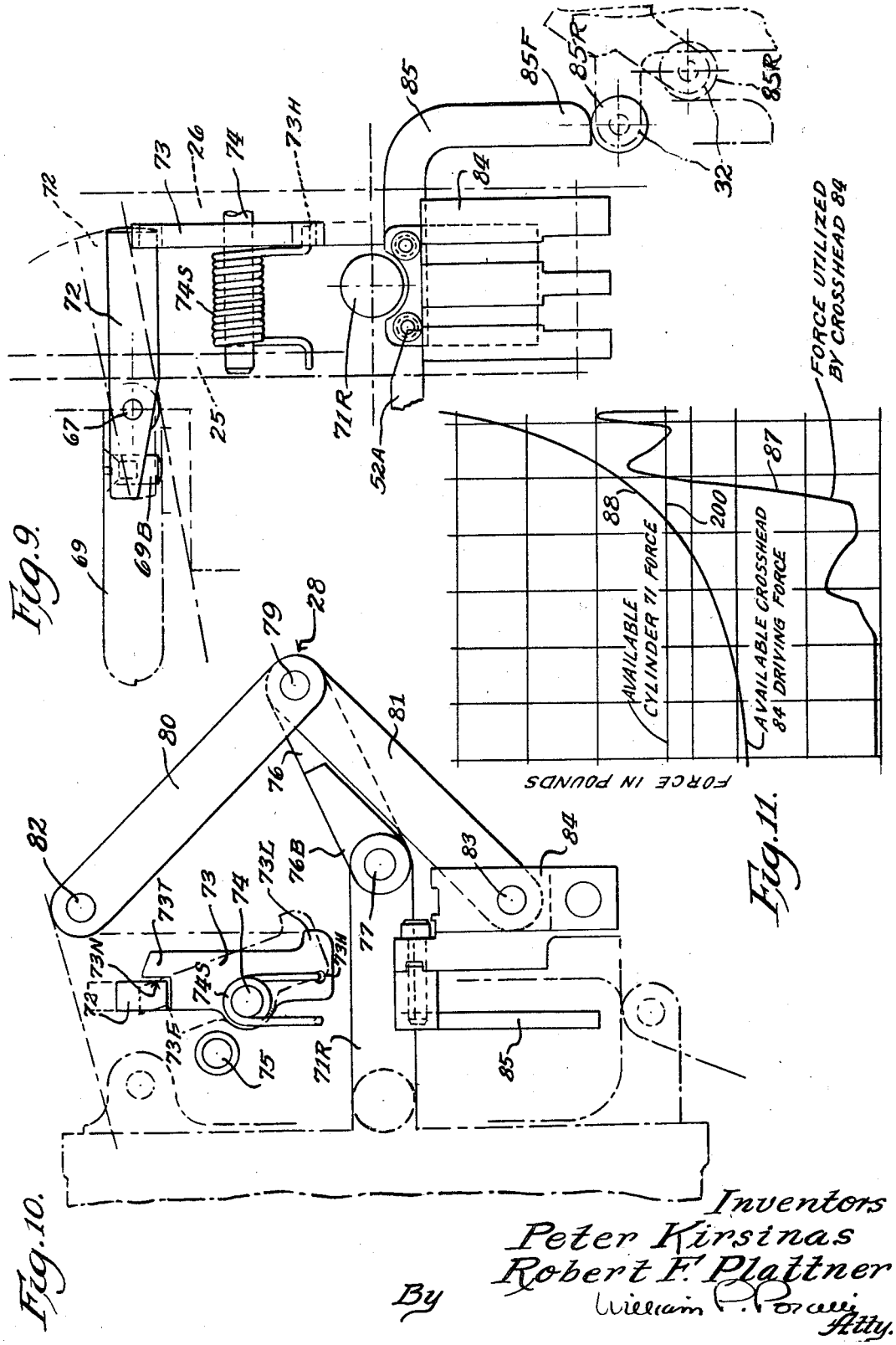

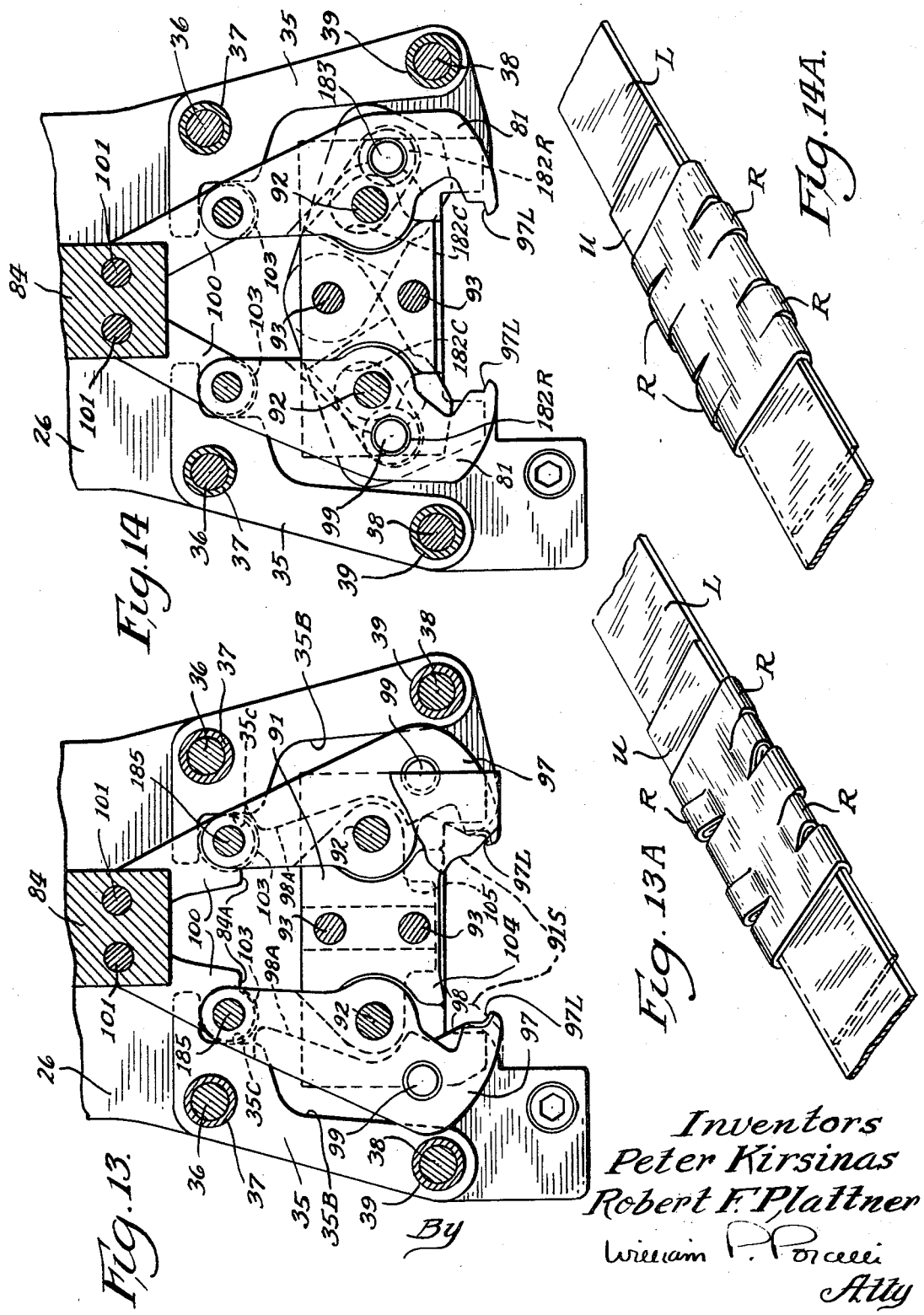

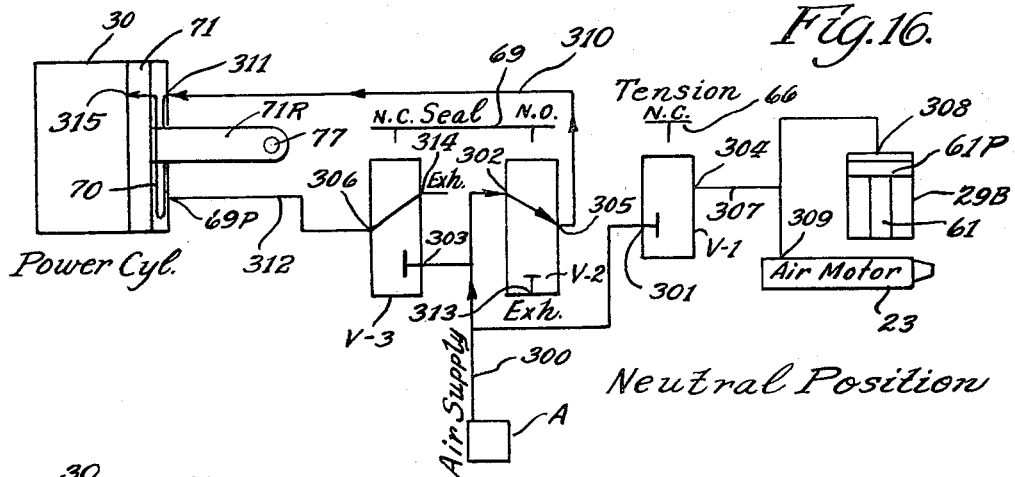
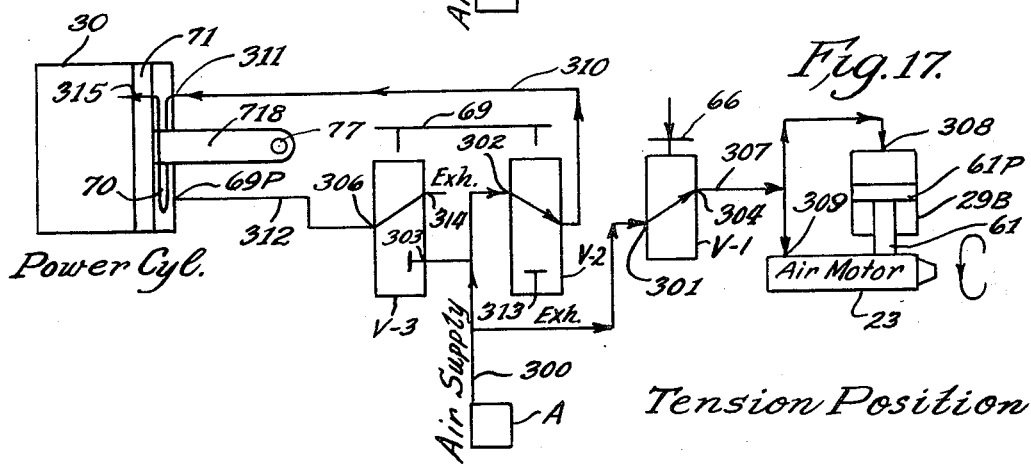
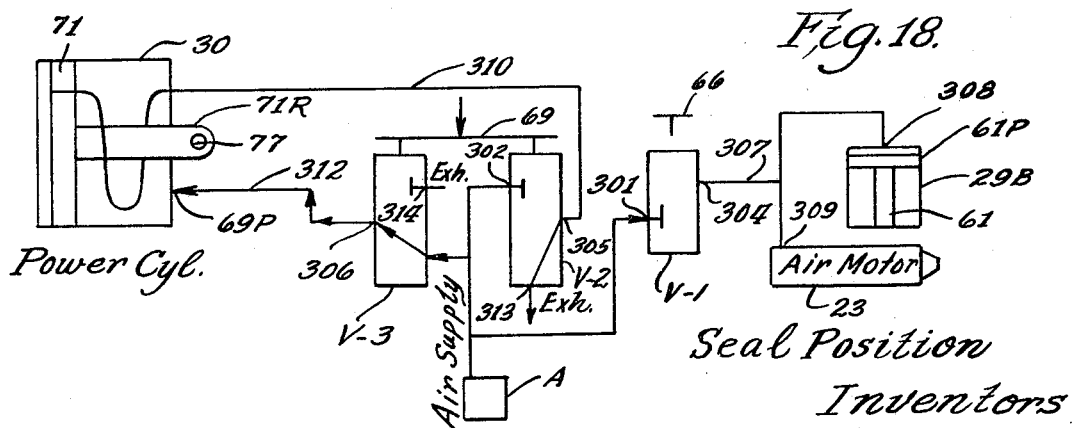

United States Patent Office 3,396,760
Patented Aug. 13, 1968

3,396,760
STRAPPING TOOL
Peter Kirsinas, Hazel Crest, and Robert F. Plattner, Chicago Heights, Ill., assignors to Interlake Steel Corporation, Chicago, Ill., a corporation of New York
Filed Mar. 4, 1966, Ser. No. 531,921
2 Claims. (Cl. 140—93.4)

ABSTRACT OF THE DISCLOSURE

A fluid powered combination strapping tool having a seal supply and capable of fully automatic operation to tension a band encircling an object, apply a crimped seal to the overlapping ends of the encircling band, shear the band while under tension, and reset to strap receiving relation. Improved latching and valving means is provided to facilitate and improve the proper sequential movements of the band tensioning means, the seal forming means and related means in the tool.

---

This invention relates to improvements in strapping tools of a type used for applying a seal to over-lapping ends of a looped band and more particularly is concerned with a pneumatic type power strapping tool that is of simplified construction and that is easy to operate through successive tensioning and sealing cycles.

In the use of power strapping tools, the operating steps of a full cycle include manual loading of the lower and upper band ends in sequence, engaging the tool in gripping relation on the band, drawing slack and tensioning the band, applying a seal to the overlapping ends of the tensioned band while shearing the supply end, and thereafter stripping the tool from the completed, sealed joint.

In the prior art, power tools for accomplishing this sequence have involved excessive manual assist or have been unduly complex in construction and maintenance and the present invention has for its principal object to provide a tool which is simpler to operate, easier to maintain, and more perfect and efficient in its performance.

Another object of the invention is the provision of a power strapping tool characterized by a continuous tension cycle, a continuous sealer cycle, and an automatic reset to facilitate release of the completed loop and reception of the band ends for the next cycle.

A further object of the invention is the provision of a power strapping tool wherein perishable parts such as the sealer jaws and punches, the shear blades, and the rotary dog may be removed and replaced with a minimum of disassembly.

Still a further object of the invention is the provision of a power strapping tool wherein the stretcher assembly is movable to effect opening and closure of band contacting parts for facilitating initial insertion, positive alignment and gripping engagement, and finally, stripping of the band ends. A related object is the provision of a power strapping tool with pneumatically operated means for initially loading the dog in penetrating relation to the band to enable tension to be built up.

Another object of the invention is to provide a pneumatic power strapping tool employing a stretcher drive arrangement utilizing high speed, high strength spiroid gears driving a rotary dog and retaining dog penetration in the event of failure of the air supply.

Still another object of the invention is the provision of a power strapping tool wherein momentary actuation of a lever is effective to initiate a continuous tensioning cycle which may continue to a stall condition or which may be interrupted either for reset or for initiating the sealing cycle at the option of the operator.

A further object is the provision of a power strapping tool wherein momentary actuation of a lever initiates a continuous automatic sealing cycle wherein downward crosshead travel operates a seal feed arm, sealer jaws, punches, and shears, and upon automatic reversal, upward crosshead travel resets the tool to its "Start" position.

Still another object of the invention is the provision of a movable latch which normally maintains the stretcher assembly elevated to facilitate band loading, which is manually engageable to enable gripping of the loaded band and which automatically re-establishes engagement and elevates the stretcher to facilitate band stripping.

A further object of the invention is the provision of a pneumatic power strapping tool having a power cylinder and piston arrangement of simplified form and employing a flexible tube for communication with the rear face of a single ended piston and cylinder system.

A further specific object of the invention is the provision of a power strapping tool having a sealer drive mechanism operable from a reciprocable piston and comprised of a toggle-actuating power link connected to pairs of swing links arranged to match crosshead travel and force characteristics to those of the seal forming mechanism.

Another object of the invention is the provision of a power strapping tool having a removable base block structure underlying the sealer region to enable access to the sealer parts for repair or replacement.

Other and further objects of the present invention will be apparent from the following description and claims, and are illustrated in the accompanying drawings which show structure embodying preferred features of the present invention and the principles thereof, and what is now considered to be the best mode in which to apply these principles.

In the accompanying drawings forming a part of this specification, and in which like numerals are employed to designate like parts throughout the same:

FIG. 2 is a side elevational view of a power strapping tool constructed in accordance with this invention;

FIG. 2A is a fragmentary plan view to show a removable base pad;

FIG. 2B is a sectional view of the plunger mechanism shown in FIG. 2 for actuating the stretcher mechanism from its load to working position;

FIG. 3 is a front elevational view of the tool shown in FIG. 2;

FIG. 3A is an enlarged fragmentary sectional view through the base region of the tool illustrating the band loading and engagement relationships;

FIG. 3B is a fragmentary plan view of the base region shown in FIG. 3A;

FIG. 3C is a partial sectional and cut away view of a portion of the mechanism shown in FIG. 3 for controlling the positioning of the stretcher mechanism;

FIG. 4 is a top plan view of the tool of FIG. 2 with parts of the power cylinder shown in section;

FIG. 5 is a developed sectional view through the stretcher drive housing taken approximately on the line 5—5 of FIG. 3, and illustrating the gearing and shaft mounting relationships;

FIG. 6 is a fragmentary sectional view through the stretcher drive housing taken approximately on the line 6—6 of FIG. 3 and illustrating the air motor and drive pinion and holding pawl elements;

FIG. 7 is a top plan view of a one-piece valve body and cylinder end plate casting;

FIG. 8 is a part sectional and part elevational view of the valve body and cylinder end plate casting and is taken as indicated on the line 8—8 of FIG. 7;

FIG. 9 is a diagrammatic view of the sealer tensioning lever and crosshead elements and is taken approximately as indicated on the line 9—9 of FIG. 4;

FIG. 10 is a diagrammatic view of the sealer drive mechanism and its relationship to the sealer lever reset cam and crosshead and is taken approximately on the line 10—10 of FIG. 4;

FIG. 11 is a graph comparing the travel versus force characteristics of the power piston and cylinder system and of the seal forming system as embodied in the present tool;

FIG. 12 is a sectional view through the parts of the sealer head assembly;

FIG. 12A is a section on line 12A—12A of FIG. 12;

FIG. 13 is an enlarged sectional view through the parts of an upcut type of sealer head assembly;

FIG. 13A is a perspective view of a completed upcut type seal;

FIG. 14 is an enlarged sectional view through the parts of a downcut type of sealer head assembly;

FIG. 14A is a perspective view of a completed downcut type seal; and

FIG. 15 is a collection of outline views of the principal parts of an upcut type of sealer head assembly.

FIGS. 16, 17 and 18 show diagrammatic representations of the major working units of the tool in relationship to their pneumatic power operation.

General description

Figure 1:
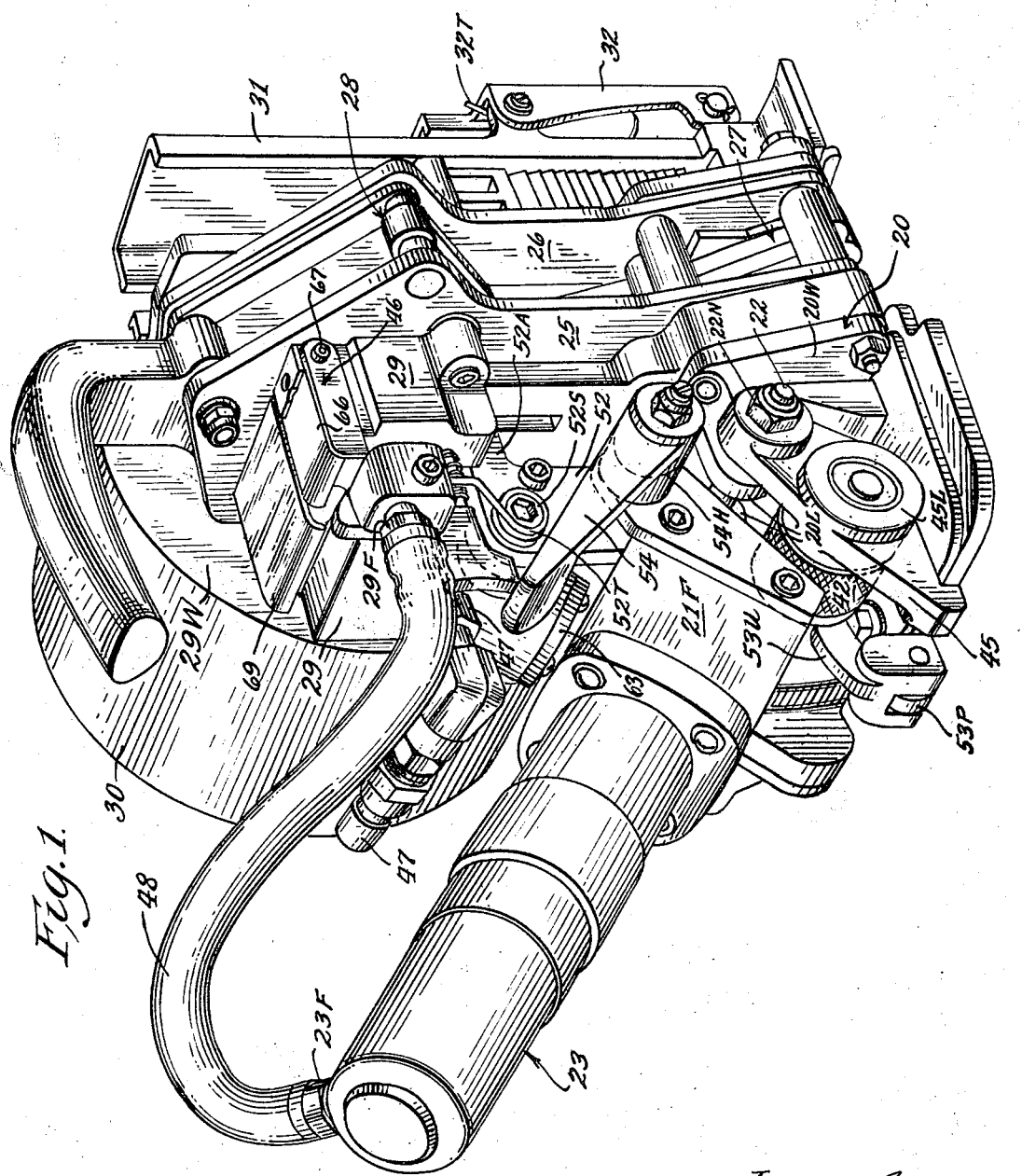
FIG. 1 is a perspective view of a pneumatic power strapping tool constructed in accordance with this invention and illustrates the general relationship of the various mechanisms and framing structures incorporated in the tool.

Referring now to the drawings, and particularly to FIGS. 1 to 4 thereof, a preferred embodiment of an automatic power strapping tool, constructed in accordance with this invention is shown for purposes of illustrative disclosure as including the following principal structural elements generally familiar to those skilled in the strapping tool art: a base casting 20; a stretcher drive housing 21 (FIGS. 5 and 6) mounted for limited swinging movement about an axis defined by a pivot pin 22 that is carried on the base; a stretcher motor unit 23 mounted directly to and movable jointly with the stretcher drive housing 21; a sealer drive housing comprised of upstanding front and rear stationary side plates 25 and 26 assembled in fixed relation to the base 20 cooperably to define a vertical chamber to accommodate a seal forming mechanism, generally indicated at 27, within its lower end and sealer drive mechanism, generally indicated at 28, within its upper end; a valve body 29 secured to the front side plate 25 and mounting a power cylinder 30 outboard of the plates 25 and 26 to face towards the sealer drive mechanism 28; a seal storage magazine 31 fixed on the rear face of the stationary side plate 26 and a seal feed arm 32 pivotally mounted to the rear of the magazine 31 and operated by means of the bell crank lever 33 that is engageable by downward movement of the sealer drive mechanism 27 to cock the seal feed arm 32.

The lower end of the magazine 31 is spanned by a separate closure plate 31F which serves as the floor of the magazine. The lower face of the floor plate 31F is bevelled outwardly and serves as a band guide facilitating band insertion.

The base 20 serves as one of the principal structural elements relating the fixed parts of the tool and it includes a horizontally enlarged contact foot 20F to be engaged against the package that is to be tied and an integral upstanding side wall 20W provided with a set of externally projecting apertured lugs 20L to receive the pivot pin 22 that mounts and stretcher drive housing 21.

The lower region of the vertical chamber which is defined between the opposed vertical faces of the stationary side plates 25 and 26 receives the seal forming mechanism 27. A pair of cam plates 34 are fixed to extend vertically along opposite sides of the lower face regions of the front side plate 25 and a corresponding pair of cam plates 35 are provided along the rear side plate 26, all to cooperate with the seal forming mechanism 27 in a manner described hereinafter.

An upper set of bolts 36 are passed through the stationary side wall 26, the upper ends of the cam plates 34 and 35, the sealer housing 25 and the upstanding base wall 20W, and are equipped with spacer sleeves 37 abutting corresponding cam plates 34 and 35 to accurately determine the assembled spaced relation of these parts. Lock nuts 36N secure the bolts 36. Similarly, a lower set of bolts 38 are passed through these same parts and equipped with similar spacer sleeves 39 and a lock nut 38N. Each of the bolts 38 extends through an integral wing 31W provided at the lower ends of the seal magazine 31.

As best seen in FIGS. 1, 3 and 5, the stretcher drive housing 21 has a gear box portion 21G (FIGS. 5 and 6) and a main sleeve portion 21S offset laterally and integrally interconnected, and having an integral rearwardly projecting lug 21L flanking one of the forwardly projecting lugs 20L on the vertical base wall 20W to journal the stretcher drive housing 21 on the pivot pin 22. The main sleeve portion 21S has internal needle bearings 21B (FIG. 5) to receive a rotary dog shaft 41 which has a splined intermediate portion 41S drivingly engaging a rotary dog 42.

The stretcher drive housing 21 is open endwise at its gear box end and a cover 43 normally closes this end and serves to mount a ball bearing assembly 43B for receiving one end of the rotary dog shaft 41. This shaft 41 is splined to receive a spiroid gear 44 which has an annular array of spiral driving teeth 44T and a cylindrical array of ratchet teeth 44R. The other end of the rotary dog shaft 41 is reduced and is carried in a bearing element 45 having an upper collar portion 45U swingably mounted on the end of the pivot pin 22 and retained thereon by a nut 22N and having a lower collar portion 45L fitted with needle bearings 45B to receive the reduced end of the rotary dog shaft 41.

The stretcher motor unit 23 is a rotary type pneumatic motor controlled from a manual valve trigger assembly 46 and powered by air supplied to an external inlet fitting 47 (FIGS. 1 and 3) for communication with an air hose 48 that is permanently connected between fittings 29F and 23F, respectively, located on the valve body 29 and on the upper end of the motor housing. The details of construction of the air motor are well known and are therefore omitted from this disclosure. The housing for the air motor is assembled to a flanged region 21F at the gear box end of the stretcher drive housing, and the motor has an output shaft 23S journalled in ball bearing assemblies 23B and 21B, respectively, one located in the end of the motor housing and the other located in the flanged region of the stretcher drive housing. The end of the motor shaft is provided with a spiroid pinion 49 which meshes with the annular drive teeth 44T on the spiroid gear. The extreme end of the stretcher drive housing 21 has a peripheral recess opening inwardly towards the cylindrical ratchet teeth 44R of the spiroid gear 44 and serving as a mounting socket for a holding pawl 49 which is rotatable about a pivot pin 49P carried in the wall of the gear box portion. A coil spring 49S normally holds the pawl 49 in engagement with the ratchet teeth of the spiroid gear 44. A pawl release pin 50 is rotatable in the cover and has an inwardly projecting flat engageable to retract the holding pawl 49, with the outer end of the pawl release pin being connected to an externally located, manually operated tension release lever 51.

In summary, it will now be apparent that the valve trigger assembly 46 is operable to actuate the motor 23 and drive the rotary dog 42 in tensioning the band. The holding pawl 49 is continually effective to block reverse rotation of the spiroid gear 44 in the event the pressure of the air supply should be relieved. Whenever desired, tension can be relieved by actuating the lever 51.

The assembly of the stretcher drive housing 21, the rotary dog 42 and the stretcher drive motor 23 is represented in its down or working position in FIG. 2 which is the position required during actual band tensioning and sealing. This assembly swings as a unit about the axis of the pivot pin 22 and its range of swinging movement may best be observed with reference to the center line of the motor housing. Two changed positions for the center line of the motor housing are illustrated in phantom in FIG. 2 and are labelled "Start" and "Load." Thus, at the "Start" position, the assembly is tilted upwardly to its maximum extent and this is a completely open position for the tool which is arranged to assume this position automatically at the end of each sealing cycle to enable stripping of the tool from the sealed band and to enable insertion of the next band.

A latch plate 52 is mounted on the valve body casting 29 to rotate about the axis of the stud 52S with a torsion spring 52T acting to bias the latch 52 clockwise as viewed in FIG. 2. The latch 52 has an arm 52A overlying and resting on the crosshead 84 of the seal forming mechanism 27 normally to maintain the latch in its FIG. 2 position. The latch is also provided with a retaining hole 52H which is arranged to receive the tip of a retractable plunger 54P carried in the hub 54H of an indexing lever 54 rotatably mounted on the rear side of the stretcher drive housing 21. A coil spring 54S is nested in the hub 54H normally to bias the plunger 54P against the latch plate 52 and the indexing lever 54 is operable to retract the plunger. The indexing lever 54 and hence the plunger 54P swing about the axis of the pivot pin 22 jointly with the stretcher assembly, and when the tool is in the "Start" position the plunger is in the retaining hole 52H and maintains the parts in the "Start" position. At this time, the lower band may be inserted. In the position of the lever 54 shown in FIG. 3C, an inner angular surface 54T mates with a corresponding and oppositely facing angular surface 54U on the stretcher drive housing 21. At this time, the arm 54 is to the left and permits the plunger 54P to be shifted to the left for engagement with the opening 52H in the latch 52. When release of the plunger 54P from the opening 52H is required, the lever 54 is elevated in clockwise direction as viewed in FIG. 2. The reaction of the surface 54T rotating against 54U causes the lever 54 to shift to the right as viewed in FIG. 3C to urge the plunger 54P to the right and out of the opening 52H. This releases the stretcher drive housing 21 to permit it to drop into load position by its weight and the force of the disc springs 58 urged against the separating plate 55 which transmits its force against a lifting link 53 which reacts against a surface 21T on the housing 21.

As best seen in FIGS. 3 and 3A, the foot portion 20F of the base 5A is provided with a socket 20S to receive an insert button B of familiar form having a knurled face to engage upwardly in gripping contact with a lower band portion. The foot portion 20F also has an integral boss 20B located along its front edge and projecting outboard and upwardly to receive a roll pin 53P for pivotally mounting the lifting link 53 which has a lower arm 53L overlying the foot section and an upper arm 53U projecting to a location to contact the stretcher drive housing 21 and enable pivoting movement of the stretcher drive housing 21 about the pin 22 to cause pivoting movement of the lifting link about the pin 53P.

In FIGS. 3A and 3B, a separating plate 55 is shown loosely seated upon a raised region 20R of the foot section 20F of the base to overhand the base in a cantilever fashion. For this purpose, a vertical lock pin 56 (FIG. 2) that is seated in the foot section 20F of the base projects through an aperture adjacent the remote edge of the separating plate 55 and a cap screw 57 and a nut 57N that are also mounted from the base and project through an aperture along the same side of the separating plate, with the nut 57N being spaced above the separating plate 55 and with disc springs 58 encircling the cap screw 57 and reacting against the nut normally to bias the separating plate 55 downwardly to a position where it may hold the lower band L against the button B. The lifting link 53 has its lower arm 53L nested in an edge notch of the foot section 20F to accommodate the desired downward movement of the separator plate 55.

As mentioned above, when the lower band is in place, the indexing lever 54 is operated to withdraw the plunger 54P from engagement with the latch 52 and allow the stretcher assembly to swing to the "Load" position, and this frees the lifting link and allows the spring 58 to load the separator plate 55 against the lower band L with a depressed stop 55L on the separator plate effecting positive alignment of the lower band.

The rotary dog 42 is still spaced somewhat above the separator plate 55 to enable insertion of the upper band U which is fed between the top of the separator plate and a band type retainer spring 62. An upraised stop 55U on the separator plate assists in automatically aligning and retaining the upper band. The "Load" position may be regulated manually with no mechanical assist but in the preferred practice of the invention a detent pin 59 is provided along the inside edge of the foot section of the base and is biased by a recessed spring 59S to engage a detent opening 21D provided in the adjoining edge of the stretcher drive housing. This detent pin 59 and detent opening 21D come into registry to determine the "Load" position of the tool.

A band spring 62 has one end 62E anchored to the vertical wall 20W. It has a sloped portion 62G against which the upper band U can be cammed into position over the separator plate 55. Its free end 62F overlies and is biased against the upper surface of the separator plate 55 to insure snug retention of the upper band after its insertion.

The valve body casting 29, as shown in detail in FIGS. 7 and 8, has a depending hollow boss or cylinder 29B (FIGS. 2 and 2B) providing a generally downwardly directed cylinder 60 in which a plunger 61 is movable. The plunger 61 has an enlarged inner end 61P serving as a piston which is to be actuated by air admitted under the control of the valve trigger assembly 46 through port 61R. A ring-like end cap 63 affords clearance for the plunger 61 to move downwardly and serves as a seat for a coil spring 61S which reacts against the piston 61P to automatically restore the plunger after air pressure is removed. The plunger 61 upon being actuated by pressurized air controlled through the valve trigger assembly 46 is engageable with a screw head 65 located externally on the flanged region at the gear box end of the stretcher drive housing 21. The plunger 61 acts to move the stretcher assembly from the "Load" position to the down or "Working" position, to bring the rotary dog 42 into pressure contact against the upper band U, this being maintained throughout the tensioning cycle.

The tension valve trigger assembly 46 includes a thumb lever 66 of inverted pan shape pivoted to an upper region of the valve body casting 29 by means of a horizontal crosspin 67 (FIG. 2). The tension valve lever 66 has an actuating pin 66A projecting downwardly from its underface to engage and operate a tensioning valve V–1 which controls application of air to the plunger 61 and to the air motor 23. A more complete description of the operation of this valve V–1 and other valves is stated hereinafter. An L-shaped keeper 68 (FIG. 2) is mounted on a horizontal pin 68P located on a forward upper region of the valve body casting, the keeper having an upwardly extending arm 68U terminating in a hook 68H and a horizontally extending arm terminating in a thumb section 68T. The keeper is normally biased in a clockwise direction as viewed in FIG. 2 by means of a coil spring 68S which is disposed in line with the thumb section of the keeper and reacts between the keeper and an external shoulder on the valve body casting 29. The tension valve lever 66 has its inward side edge shaped to define a catch 66C oriented in the same vertical plane as the keeper hook 68H.

Upon actuation and downward swinging movement of the tension valve lever 66, the catch 66C cams past the keeper hook 68H and is then held down as the keeper hook moves into overlying interlocking relation on the catch. The operation of the tension lever 66 to apply air to the plunger 61 for lowering the stretcher assembly and engaging the dog 42 and to apply air to the motor 23 requires only momentary manual actuation, as the action of the keeper 68 maintains the tension valve lever depressed without further assist from the operator. The rotary dog 42 is driven by the motor 23 until band tension builds up and the motor stalls. If necessary at any time, the thumb section 68T of the keeper can be actuated to release the tension valve lever 66 and cut off air supply. Tension at this time would still be maintained as the band tension acts on the dog 42 to maintain the dog penetration while the holding pawl 49 prevents reverse rotation of the dog. The tension release lever 51 can be operated to remove tension.

A sealer valve trigger assembly is positioned directly alongside the tension valve assembly and it includes a sealing lever 69 of flanged inverted pan shape which is also swingably mounted on the horizontal pivot pin 67. The sealer lever 69 has a cam formation 69C along its side edge adjacent the keeper 68 to cause depression of the sealer lever 69 to pivot the keeper hook 68H free of the catch 66C and permit the tension lever 66 to restore and shut off air to the motor 23 and to the plunger 61. Band gripping is maintained, even though the plunger 61 rises, due to the action of the tensioned band on the dog 42 which is held against reverse rotation by the holding pawl 49. The sealer lever 69 is fitted with a pair of depending pins 69A and 69B on its under face, with the pin 69A being associated with a normally open valve V–2 located in the valve body casting and with the pin 69B being associated with a normally closed valve V–3 in the valve body casting 29.

When the sealer lever 69 is in the up position, the normally open valve V–2 associated with the pin 69A establishes communication of main line air through the cylinder end plate wall 29W of the valve body 29 through a nipple 29N provided in the cylinder end plate 29W, through a spirally wound flexible hose 70 in the cylinder and finally through a nipple 71N mounted on and feeding air through the main wall of a power piston 71 which is reciprocable through the power cylinder 30. Thus, high pressure air from the main line is applied to the rear face of the power piston 71 whenever the sealer lever 69 is up. The power piston 71 is connected to a piston rod 71R which extends laterally into the sealer mounting chamber to reciprocate the sealer drive mechanism through its power and return strokes.

When the sealer lever 69 is depressed, thereby releasing the tension lever 66, full main line air capacity is available to drive the power piston 71 towards the integral rear wall 30W of the power cylinder. When the sealer lever 69 is down, its pin 69A causes the normally open valve V–2 to close and block the air supply to the remote face of the piston 71, while concurrently establishing a path for exhausting air from the back of the piston as hereinafter described. Simultaneously, the pin 69B opens the normally closed valve V–3 to apply high pressure air through a port 69P communicating directly to the front face of the piston 71 for developing the power stroke of the tool during which the seal action occurs. Provision is made to maintain the sealer lever 69 depressed automatically. For this purpose, an elongated bar 72 (FIGS. 9 and 10) is mounted to rotate on the horizontal pivot pin 67 and at one end underlies and is secured to the sealer lever 69 to swing in unison with it. The free end of the bar 72 projects across the sealer chamber and normally seats in a corner notch 73N provided at the upper end of a cam lever 73, which is mounted upon a shank 74 that is carried by the side plates 25 and 26. A torsion spring 74S encircles this shank and at one end is anchored to the front side plate 25 and at the other end engages in a hole 73H provided at the lower end of the cam lever 73. The torsion spring 74S normally acts to urge the cam lever counterclockwise as viewed in FIG. 10 and such movement of the cam lever is prevented by the bar 72. Depression of the sealer lever 69 elevates the free end of the bar and allows the cam lever 73 to rotate until its side face 73F strikes the stop pin 75 at which point the top corner 73T of the cam lever underlies the bar 72 and maintains the sealer lever 69 depressed throughout the power stroke of the piston 71.

The sealer drive mechanism, as best shown in FIG. 10, includes a power link 76 having a bifurcated end 76B pivotally engaged on the power pin 77 which is carried crosswise in the end of the piston rod 71R, with a pair or rollers 78 being located at opposite ends of the power pin 77 to facilitate free rotation of the power link within the space defined between the front and rear side plates 25 and 26. The other end of the power link 76 carries a power pin 79 which connects upper and lower pairs of swing links 80 and 81, respectively, in a toggle relation. The swing links 80 of the upper pair are rotatable about a fixed pivot pin 82 that extends between the side plates, and the swing links 81 of the lower pair are rotatable about a power pin 83 carried in the crosshead 84.

In FIG. 10, the sealer drive mechanism is shown in its topmost position wherein the piston rod 71R is fully extended, the power link 76 is upwardly inclined and the swing links 80 and 81 are substantially in right angled relation. When high pressure air is applied to the front face of the power piston 71, the piston rod 71R is retracted, drawing the power link 76 and swing links 80 and 81 inwardly and driving the crosshead 84 down.

Downward movement of the crosshead 84 operates the sealer mechanism 27. The latch 52 rotates clockwise at the torsion spring 52T urges the latch arm 52A in a crosshead following mode until the latch hole 52H registers with the plunger 54P. Return of the crosshead 84 restores the latch 54 and litfs the stretcher assembly to its "Start" position. This return movement is powered by return movement of the piston 71 to its FIG. 4 position.

The crosshead 84 carries a side arm 85 which has a depending free end 85F that rides downwardly against a roller 85R which is journalled on the free arm of a bell crank lever 33, the other arm of which is rigidly fixed to the seal feed arm 32 to cause cocking of the seal feed arm about its mounting pin 86 concurrently with the sealer stroke of the crosshead 84. As the crosshead travel is completed, the inside edge of one of the swing links 80 strikes a lug 73L projecting laterally at the lower end of the cam lever to reset the cam lever 73 to the FIG. 10 position and enable the sealer lever 69 and its retainer bar 72 to return to the position of FIG. 9. The seal cycle and seal feed will now be completed as the sealer lever 69 redirects air to the rear of the piston to advance the piston rod 71R and raise the crosshead 84, the latch 52 and the stretcher assembly. The tool is now ready to be stripped from the band.

The toggle-like action fo the swing links 80 and 81 of the sealer drive arrangement is arranged to match the characteristic force-travel curve of the seal forming mechanism. This curve, as shown at 87 in FIG. 11, peaks after the jaws have folded the seal legs and while the punches are rupturing the seal and band. The force-travel characteristic of the swing link system is shown at 88 in FIG. 11. The variable mechanical advantage existing in the particular drive arrangement disclosed herein is such that at the start position at low mechanical advantage, a given rate of piston movement produces relatively fast crosshead travel at low available force on the crosshead 84 and when the punches of the sealer are rupturing the band, approximately the same rate of piston movement produces relatively slow crosshead travel at high available force on the crosshead because of the high mechanical advantage with approximately a uniform available force applied to the power piston 71. Thus, the drive arrangement disclosed herein exhibits the important features of more closely approaching the desirable condition wherein the force applied to the piston 71 throughout its power stroke may be substantially uniform. In the diagram shown in FIG. 11, the force in pounds is indicated along the Y-axis and the travel of the crosshead 84 is shown along the X-axis. The curve 200 represents the available force on the cylinder 71, the curve 88 represents the available driving force on the crosshead 84 due to combination of the available force on the cylinder 71 and the multiplication of the force by the swing links 80 and 81, and the curve 87 represents the force utilized by working parts of the sealer mechanism. It should be noted that the available force on the cylinder 71 is constant while the total available force on the crosshead 84 always exceeds the force utilized by the sealer mechanism which are the conditions required for operation.

The sealer jaw and punch assembly of the seal forming mechanism 27 may be either of an upcut type (FIG. 13) to produce a final seal configuration (FIG. 13A) wherein the ruptured portions R are deflected upwardly or of a downcut type (FIG. 14) to produce a final seal configuration (FIG. 14A) wherein the ruptured portions R are deflected downwardly.

For the upcut type, the sealer jaw and punch assembly as shown in FIG. 12 includes front and rear side plates 90 and 91, respectively. The rear side plate 91 is provided with depending band guide surfaces 91S that span the overlapping ends of the band after proper insertion thereof. The surfaces 91S serve to retain the desired alignment of the band while slack is being pulled out of the band loop, and while tension is being applied to the band and the band finally sealed. The sealer mechanism includes pairs of jaw pivot pins 92 and bridge holding pins 93, with the ends of these pins 92 and 93 seating in the side plates 90 and 91.

A stationary shear blade 94 (FIG. 12) is mounted within and alongside the lower front region of the sealer chamber which is appropriately recessed to accommodate a limited vertical floating movement for the stationary shear blade 94. A tang 94T along one vertical edge of the stationary shear blade 94 nests in a corner cut out adjacent the front side plate 25 to prevent cocking of the stationary shear blade. The stationary shear blade 94 has a relieved region 94R defining a cantilever arm 94A that extends immediately adjacent the separator plate 55 also to separate the upper and lower portions of the band. The floating mounting of the stationary shear blade 94 allows its cantilever arm 94A to seat intimately against the lower band and thereby avoids imposing severe cantilever action during band shearing. A lifter spring 95 is located within the base to underlie and act upwardly against the stationary shear blade normally to hold it elevated sufficiently to accommodate insertion of the lower band beneath the arm 94A.

The base pad 19 as shown in plan view in FIG. 2A has a thickened edge 19E provided with an offset integral lug portion 19L apertured to receive a cap screw (not shown), the only fastener holding the base pad. The base pad has a socket 19S for the spring 95 (FIG. 12A) and has an edge tang 19T to nest in an edge notch of the base 20.

A movable shear blade 96 is nested alongside the stationary shear blade 94 and it is arranged to be moved down upon downward movement of the crosshead 84 to sever the upper band after folding of a seal and during deforming of the seal with overlapped band ends, with the shearing action occurring at a region of the band which is under tension. The movable shear blade 96 is nested within the movable side plate 90 and is associated with flats 92F provided at the front ends of the jaw pivot pins 92 to hold these pins against rotation during sealer actuation.

Outline views of the jaws 97, the punches 98, the bridges 104 and the tie bars 105 are shown in FIG. 15.

Four pairs of identical jaws 97 are incorporated in the sealer mechanism with the central pairs of jaws being adjacent to each other and being separated from the outer pairs of jaws by intervening pairs of punches 98. The punches 98 are mounted on pivot pins 99 which extend through the stacked array of jaws and the upper ends of the jaws are connected to lower ends of a pair of spreader links 100 by means of link pins 101, with the upper end of each spreader link 100 being pivoted to the crosshead 84 by a crosshead pin 102. The sealer mechanism is regulated by the cam plates 34 and 35 which are fixed as previously described. The link pins 101 of the sealer are equipped at their ends with cam rollers 103 that ride along the surfaces of the cam plates 34 and 35 to regulate the timing of the jaw action during downward movement of the crosshead 84. Each pair of jaws 97 has a centrally located bridge 104 associated with it and each pair of punches 98 has a centrally located tie bar 105 associated with it, with the bridges 88 and tie bars 99 constituting a stacked array. The tie bars function as spacers in this array and also serve to restrict the movement path of the punches 98.

The jaws 97 terminate at their free ends in retention lips 97L that guide the seal when it is being fed into the sealer head 27 and hold the seal over the two overlapping band ends to insure alignment after the sealer head is lowered into the intermediate position and while tension is applied.

The parts of the downcut sealer of FIG. 14 are similar in many respects to those of the upcut sealer of FIG. 13. In the downcut sealer, however, the punches 182 are substantially different and are both pivoted on the upper bridge pivot pin 93. The punches 182 are formed with elongated cam slots 182C having cam rollers 182R operable therein. Punch actuator pins 183 extend through the aligned stacks of jaws 81 and punches 182 and carry the rollers 182R to cause the swinging movement of the jaws 81 to drive the punches 182 angularly about pivot pin 93 while the slots 182C are guided between cam rollers 182R. As this occurs, the punches 182 moved toward each other to form the downcuts R of the joint as shown in FIG. 14A.

The particular action of the jaws 97 and the punches 98 of FIG. 13 for the purpose of forming an upcut joint between the overlapping band ends U and L is characterized by having both the jaws and punches pivotally movable. In the most common type of joint forming mechanism, the punches are stationary. When the punches are located properly for an upcut seal, the sealer mechanism does not lend itself to use in a strapping tool employing feeding of seals from a stack because the stationary punches are ordinarily in the seal feed path. By having the punches 98 movable to and from sealing position, they can be cleared of the seal travel path during the seal fed operation. More particularly, the action of the mechanism shown is that the jaws 97 move toward each other to initially bend the legs of a seal S around and beneath the band ends. During the final wrapping action of the seal legs, the linkage arrangement is such that the punches 98 begin to form the upcuts R at the edges of the seal joint. The angular movement of the punches 98 occurs by action of projecting corners 84A on the links 100. As the links 100 are pivoted sufficiently, these corners 84A engage the upper ends 98A of the punches 98 to cause the angular movement upon continued pivoting motion of the links 100. The bridges 104 react against the other portions of the seal S to maintain them in a fixed position while the upcut portions R are being deflected. The arrangement of the toggle formed by the links 100 and the jaws 97 is such that the folding action of the seal legs is completed prior to the final movement of the crosshead 84 and as the pins 185 have reached their furthest positions apart. Continued downward movement of the crosshead 84 actually causes an overrun of the toggle which provides slight reverse movement of the jaws 97 while the punches 98 complete the upcuts R. The advantage of this is that the folding of the seal legs is completed prior to the formation of the upcuts R. On other devices, this is not generally the case and the result is a joint with the legs of the seal protruding slightly downwardly away from the joint without achieving a flat joint.

As the linkage proceeds past toggle and the jaws 97 are retracted away from contact with the seal joint, the loading of these jaws 97 on the joint is relieved so that more force is available for the shearing operation which immediately follows at the extreme final travel portion of the crosshead 84. The cam surfaces 35B of the cams 35 are shaped to prevent the jaws and punches from closing prematurely on the forward stroke, to insure that the jaws and punches are opened on the return stroke and to limit the upward travel of the entire sealer assembly on the return stroke. Any premature closing of the punches and jaws prior to locating the punches and jaws in their proper aligned position relative to the overlapping band ends can cause faulty formation of a joint. The regions 35C of the cams 35 keep the jaws and punches in their open position until the sealer assembly is properly positioned. After the surfaces 35C are passed, the cam surface is shaped to allow outward movement of the rollers 103 to permit the toggle effect to take place and close the jaws and punches to complete a strap joint.

As has been mentioned previously, the arm 85 which is carried by the crosshead 84 engages the roller 85R of the seal feed arm 32 during downward crosshead travel and this cocks the seal feed arm 32 to the position as shown in phantom outline in FIG. 2 in preparation for feeding the next seal. As is conventional, the seal feed arm 32 is biased by a torsion spring 32T (FIGS. 1, 2 and 4) to produce seal feeding rotation thereof and actuate the seal feed finger 132 which is arranged to underlie the seal magazine 31 for picking up the next seal and urging it against a rear removable side plate 104. The side plate 104 is at a down position by the time the seal feed arm 32 is free to uncock. Actual seal feed is delayed until the crosshead 84 has completed its full down stroke and has almost completed its upward or return movement, when the rear removable side plate 104 has moved clear of the next seal and allows the seal to enter the new open jaws 81 to be retained on the jaw lips 97L. The seal is fed forward until it engages the removable front side plate 105. Upon subsequent downward travel of the crosshead 84 during the next seal cycle, the jaws 81 deposit the seal on the overlapping band ends and then fold and crimp it.

*Operation*

In a typical operating cycle, the tool will be in the position indicated in FIG. 2 except that the stretcher assembly will be rotated upwardly so that the center line of the motor housing 23 will lie along the line labelled "Start." In this position, the stretcher drive housing 21 has contacted and rotated the lifting link 53 counterclockwise, as viewed in FIG. 2, to elevate the separator plate 55 above the foot section 20F of the base 20. The operator may now now insert the lower band L (FIG. 3A) under the separator plate 55 to be engaged against the knurled face of the button B and retained in desired alignment by means of the depending integral stop 55L. The indexing lever 54 is then elevated clockwise as viewed in FIG. 2 to withdraw the plunger tip 54P (FIG. 3), as previously explained, from the latch hole 52H to allow the stretcher assembly to rotate to a position wherein the center line of the motor housing lies along the line labelled "Load" in FIG. 2. In this position the lifting link 53 no longer acts to elevate the separator plate 55 and the disk springs 58 (FIG. 3A) hold the separator plate against the lower band L. In the preferred practice, the lower band is inserted so that the leading edge extends approximately to the region underlying the seal magazine 31.

The "Load" position for the stretcher assembly is determined by the base mounted detent pin 59 (FIG. 3A) which engages in a detent opening 21D along the intermediate side face of the stretcher drive housing 21. At this position, the rotary dog 42 is elevated slightly above the separator plate and the operator may now feed the upper band U between the retainer spring 62 and the separator plate 55.

The operator now presses the tension valve lever 66 to actuate the plunger 61 which forcibly drives the stretcher drive housing 21 counterclockwise, as viewed in FIG. 2, to impress the rotary dog into biting engagement upon the upper band U. Ordinarily, tools of this type rely upon spring loading for initial biting engagement. However, high strength band materials are harder and require greater normal loading force to achieve this initial penetration and the plunger 61 insures this greater force. Simultaneously, the air motor 23 starts and drives the rotary dog clockwise, as viewed in FIG. 2, to tension the band. The tension lever 66 remains down throughout the tensioning cycle by the action of the keeper hook 68H against the catch 66C formed on the tension lever, but tension can be arrested at any level by manually pressing the thumb section 68T of the keeper. The holding pawl 49 will then retain the tension reached when arrested. If the tension is not arrested, the tool will tension until the motor stalls.

At stall, or during tensioning, at the option of the operator, the sealer lever 69 is depressed. This motion frees the keeper 68 from the tension lever 66 to allow shutoff of air to the plunger 61 and to the air motor 23 and make all air available for driving the sealer. The sealer lever remains depressed throughout the seal stroke by the action of the cam 73 and the retained bar 72 of FIGS. 9 and 10. While the sealer lever is down, the valve V-3 diverts high pressure air through port 29P (FIG. 8) and against the front face of the piston 71 to drive the piston rearwardly through the power cylinder 30 and retract the piston rod 71R and drive the swing links 80 and 81 in a fashion to move the crosshead downwardly.

The downward travel of the crosshead 84 lowers the sealer parts to cause a seal already supported in the jaws 97 to be deposited over the band ends, the seal feed arm 32 to be cocked, the sealer jaws and punches operated to fold and crimp the seal, and the movable shear blade 96 to shear the upper band U. Concurrently, end 52A of the latch 52 follows the crosshead 84 so that the latch 52 rotates clockwise as viewed in FIG. 2 by action of its spring 52T until its hole 52H registers with and receives the plunger 54P to cause the crosshead 84, upon its return movement, to lift the stretcher assembly by the connection between the plunger 54P and the hole 52H. At the bottom of the crosshead stroke, the upper swing link 80 (FIG. 10) strikes the lug 73L to return the cam lever 78 and restore the sealer valve lever 69. This allows valve V-3 to shut off air to the front face of the piston while valve V-2 supplies air through the flexible tubing 70 to the rear face of the piston 71 to move it forwardly to its initial position, during which the crosshead is elevated, allowing feeding of the next seal and causing the latch 52 to lift the stretcher assembly. The band ends have now been sealed, and the supply end sheared, and the parts of the tool disengaged from the band to enable the tool to be stripped from the completed band loop. It is immediately ready for another similar tensioning and sealing cycle.

The operation of the tool more specifically with respect to the pneumatic system can be better understood by reference to FIGS. 16, 17 and 18. In FIG. 16, the major components of the tool are indicated diagrammatically as valves V-1, V-2 and V-3, sealer or power cylinder 30 and its piston 71, air motor 23 and cylinder 29B and its piston 61P including its piston rod or plunger 61.

Air under pressure is supplied from a suitable pressure source A, such as an air pump. This air source A is connected by a conduit 300 which connects to three branch conduits connecting to valves V–1, V–2 and V–3 at ports 301, 302 and 303 which supply high pressure air through the valves V–1, V–2 and V–3. The valves are also provided with additional ports 304, 305 and 306 which lead to the power units. Port 304 is connected to a conduit 307 which branches to connect to port 308 leading into one end of the cylinder 29B and port 309 leading to the air motor 23. Port 305 connects to a conduit 310 which connects to port 311 of the power cylinder 30. Port 306 connects to conduit 312 leading to port 69P of the power cylinder 30. In addition, valve V–2 has a port 313 and valve V–3 has a port 314, both leading to exhaust.

As particularly shown in FIG. 16, all parts are in their start positions when the tool is ready for operation and air is supplied to it from the air power source A. In this case, there is no pressure supplied to either the air motor or the cylinder 29B, but there is pressure supplied to the power cylinder 30 through the valve V–2 by way of ports 302 and 305, as indicated. In this situation, the air under pressure goes through port 311 of the power cylinder 30, through the flexible hose 70 within the cylinder 30 and to the rear face of the power piston 71 through the port 315. This keeps the piston rod 71R extended. With this condition of the components, the tool is ready for strap threading. The lower end L of the band is inserted beneath the separating plate 55, the lever 54 is actuated to move the air motor 23 from the "Start" to "Load" position in order to allow the separating plate to clamp against the lower end L of the band, and a loop of the band is encircled about the object to be strapped. The upper end of the band is then superimposed above the lower band end and the separating plate 55 and slack is manually pulled out of the loop of band by withdrawing the upper end U of the band relative to the lower end L of the band.

The tension valve lever 66 is then depressed to cause actuation of the valve V–1. The condition resulting from this is indicated in FIG. 17. The relationship of the valves V–1 and V–2 with respect to the air supply A and the power cylinder 30 is unchanged. However, port 301 connects through the valve of the port 304 which in turn supplies high pressure air to the port 309 of the air motor and port 308 of the cylinder 29B. Instantaneously, the plunger 61 is extended to force the air motor 23 into its "Work" position. The air motor begins to tension the band and tension continues until the air motor stalls, unless tension is arrested by means previously described.

After suitable tension is reached, the sealing lever 69 is depressed. This causes return of the tension valve lever 66 so that air under pressure is removed from both the air motor 23 and the cylinder 29B. Simultaneously, air under pressure is removed from the port 305 of the valve V–2 as port 302 is blocked. The air under pressure is, however, diverted through valve V–3 by means of ports 303 and 306 to connect through port 69P of the cylinder 30 against the inner face of the power piston 71 to cause the piston rod 71R to be retracted. Port 305 is connected to exhaust through the port 313 and this allows air to exhaust from the far side of the power piston 71 through the flexible hose 70. During the retraction of the piston rod 71R, a joint is formed by the sealer mechanism 27, the upper end U of the band is sheared and a new seal is fed from the seal magazine 31 into the jaws of the sealer 27. As the swing links 80 and 81 complete their travel at the bottom of the stroke of the crosshead, the upper swing link 80 strikes the lug 73L to return the cam lever 78 and restore the sealer lever 69 to its elevated position. When this occurs, valves V–2 and V–3 are restored to their positions as shown in FIG. 16 which causes the piston rod 71R to again extend to the position as shown in FIG. 16. This elevates the sealer mechanism 27 and places the tool in condition for another cycle of operation.

*Advantages*

The invention provides an air powered combination strapping tool having its own seal supply and capable of fully automatic operation to tension the band, apply, fold, and crimp the seal, shear the band while under tension, and reset to strap-stripping and/or receiving relation. The stretcher assembly is located on the operator's side of the tool and is arranged to pull the loose end of the band towards the operator and this enables the operator, where extreme slack conditions exist, to pull the band through manually if so desired. The dog marks from the previous sealing cycle are on a portion of the band which is hidden and which is not in the load carrying region of the sealed loop. In addition, the marks on the lower band are due to the action of the button B on its underface and are not in sight.

The stretcher arrangement operates at high speed; for example, a rotary dog of 1½ inches diameter may be driven at 64 r.p.m. to enable 5 inches per second of linear band takeup. The rotary dog may rapidly be replaced simply by removing the nut 22N and the bearing 45. The tension established by the stretcher is maintained by the holding pawl 49 even in the event of loss of air, as the built up band tension acts to accentuate the bite of the dog so long as the dog is held against reverse rotation of the pawl 49. Manual release of tension at any time is faciliated by the convenient lever 51 which disengages the holding pawl 49.

The arrangement of the tension valve lever 66 is desirable in that momentary actuation enables it to complete a continuous tensioning cycle and stall the air motor 23 without impairing the action and which may be interrupted at any time either by depressing the keeper 68 or by actuating the sealer valve lever 69 to start the seal cycle.

The seal cycle is continuous in that the power piston 71 is driven through its full stroke whereupon the upper swing link 80 acts against the cam 73 to reset automatically valves V–2 and V–3 and restore the piston. The tool also provides for automatic reset in that the reverse travel of the piston and the crosshead return all of the parts of the tool to their initial "Start" position.

Thus, while the preferred features of the invention are embodied in the structure illustrated herein, it is to be understood that changes and variations may be made by those skilled in the art without departing from the spirit and scope of the appended claims.

What is claimed is:

1. In a strapping tool for tensioning and sealing upper and lower overlapping ends of a strap loop that encircles an object, rigid main framing structure providing a vertical central chamber, seal storage and feed mechanism adjacent the central chamber, and a pivot shaft adjacent the central chamber, said rigid main framing structure including a fixed base contact foot, a stretcher drive housing mounted to said framing structure on said pivot shaft to swing about the pivot shaft and move towards and away from the contact foot, tensioning wheel means carried on said stretcher drive housing to rotate about an axis therethrough that is correspondingly swingable with the stretcher drive housing about the pivot shaft, a stretcher drive motor swingable bodily with said stretcher drive housing and rotatable unidirectionally in driving engagement with the tensioning wheel means, seal forming mechanism vertically shiftable through a lower region of said chamber, sealer drive mechanism including a cylinder fixed to the framing structure and housing a ram connected to a toggle-like swing linkage that shifts the seal forming mechanism, a fluid power circuit having a first valve controlling flow of fluid to the drive motor, a second valve controlling flow of fluid to one side of the ram, and a third valve selectively associated with the second valve and controlling flow of fluid to the other side of the ram, a latch shiftably mounted on said framing structure and resiliently biased to follow downward travel of the seal forming mechanism and to return in response to upward return movement of the seal forming mechanism, a plunger mounted on the stretcher drive housing and releasably engageable with the latch when the seal forming mechanism moves down to enable the latch by connection with the plunger to lift the stretcher drive housing at the end of a tool operating cycle, first lever means operable to hold the first valve operated until full tension is developed, second lever means operable to release the first lever means and first valve and to position the second and third valves to supply power to lower the seal forming mechanism, means responsive upon initiation of the power stroke to hold the second lever means operated, means responsive upon completion of the power stroke for repositioning the second and third valves to supply power to raise the seal forming mechanism and restore the tool to original position.

2. In a strapping tool for tensioning and sealing overlapping ends of a strap loop that encircles an object, rigid main framing structure providing a main chamber, a stretcher drive housing carried in shiftable relation by said main framing structure, tensioning wheel means rotatable about an axis through said housing and shiftable with said housing to engage one of said strap ends, means for driving said tensioning wheel means, seal forming mechanism vertically shiftable through said chamber, means operable for driving the seal forming mechanism downwardly to crimp a seal about said strap ends and operable to return the seal forming mechanism, a latch shiftably carried on said framing structure and resiliently biased to follow downward travel of the seal forming mechanism and to return in response to return movement of the seal forming mechanism, and releasable detent means engageable to couple the stretcher drive housing and latch after downward follower travel of the latch to enable return movement of the latch by its engagement with the stretcher drive housing to shift the stretcher drive housing and cause disengagement of the tensioning wheel means from the strap end it engages after sealing of the strap ends.

References Cited
UNITED STATES PATENTS

| | | | |
|---|---|---|---|
| 2,415,181 | 2/1947 | Johnson | 92—110 |
| 3,032,075 | 5/1962 | Hall et al. | 140—93.4 |
| 3,146,680 | 9/1964 | Hutter et al. | 92—12 |
| 3,198,218 | 8/1965 | Ericsson et al. | 140—93.4 |
| 3,329,178 | 7/1967 | Plunkett | 140—93.4 |

CHARLES W. LANHAM, *Primary Examiner.*

L. A. LARSON, *Assistant Examiner.*